Sept. 29, 1964  R. E. BAGGESON  3,150,945
FILTER RETAINER FOR FILTER CELL
Filed April 30, 1962
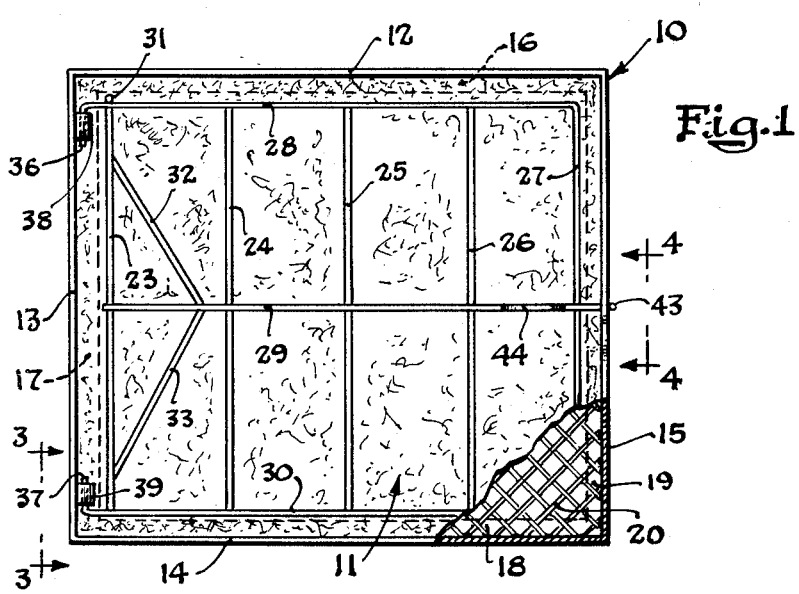
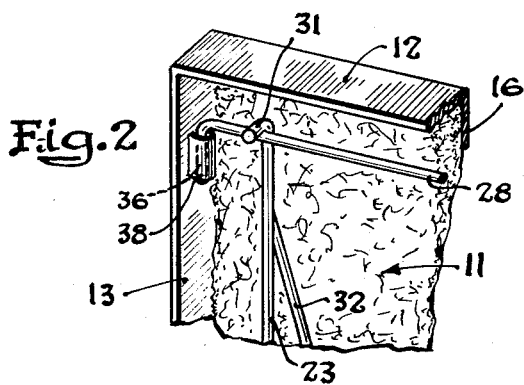
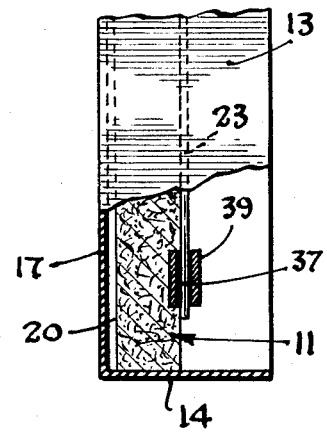
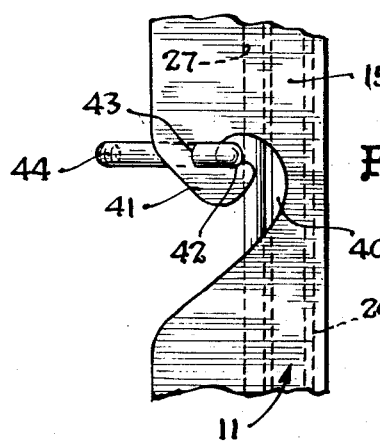
Inventor
Russell E. Baggeson
By Darbo, Robertson & Vandenburgh
Attorneys 3,150,945
FILTER RETAINER FOR FILTER CELL
Russell E. Baggeson, Irving, Tex., assignor to Burgess-Manning Company, Dallas, Tex., a corporation of Illinois
Filed Apr. 30, 1962, Ser. No. 191,042
4 Claims. (Cl. 55—493)

The present invention relates to a retainer structure for an air filter or the like.

The present invention pertains to an effective and yet inexpensive apparatus for holding an air filter in place in a filter cell. It is particularly advantageous because it is most inexpensive to manufacture. It may be formed of a metal wire or rod. The terms wire and rod are used synonymously herein.

Not only are the raw materials inexpensive, but in addition, the cost of fabrication of the retainer and its associated mounting parts easily and simply may be performed by ordinary metal working operations.

Despite its relative low cost, the apparatus is effective to hold the air filter in place in the cell. It is hinged at one side with a latch at the other side so that it readily may be opened for removal and replacement of the air filter. With the air filter in place and the retainer latched in the closed position it will securely maintain that position. There is no opportunity for it to inadvertently open as a result of jar, vibration, etc.

A further advantage of my invention is that the retainer easily may be removed from the cell should that prove to be necessary, as for example, should it be damaged by carelessness or other accident. While it is a simple matter to intentionally remove the retainer, the structure is such that complete or partial removal will not occur during the normal opening and closing of the retainer in the course of replacing a filter.

Further objects and advantages will become apparent from the following description taken in conjunction with the drawings in which:

FIGURE 1 is an elevational view of a filter cell incorporating an embodiment of my invention and having a portion broken away;

FIGURE 2 is a perspective view of the top left corner of the embodiment as viewed in FIGURE 1;

FIGURE 3 is a partial elevation as viewed at line 3—3 of FIGURE 1 with portions broken away; and FIGURE 4 is a partial elevation as viewed at line 4—4 of FIGURE 1.

FIGURE 1 illustrates a filter cell including an outer frame generally 10. As will be apparent to those skilled in the art, frame 10 alone could be inserted in a duct or at an opening in a baffle, whereby a fluid (usually air) would be forced to flow through the filter generally 11. Alternatively, a plurality of frames 10 could be fitted together to define a multiple cell filter system. Frame 10 is formed of four L-shaped members secured together at their corners. Thus the structure has four side walls 12–15 each having a rear flange 16–19, respectively. Flanges 16–19 form an abutment to hold wire screen 20 in place. Screen 20, for example, may be formed of expanded metal. It is employed to support one side of filter 11.

In the illustrated embodiment the retainer is defined by five vertical wires or rods 23–27 and three horizontal wires or rods 28–30. The exact number and position of the various rods 23–30 with respect to each other is not of primary significance. It is desirable to use the fewest number of rods sufficient to do the job so as to maintain the lowest possible cost. Each of vertical rods 24–27 is secured to each of rods 28–30 as by means of spot welding. As a matter of fact, it will be apparent to those skilled in the art that several of these rods may be fabricated from a single length of material merely by bending the same. Rod 23 similarly is affixed to each of rods 29 and 30. However, there is no permanent attachment between rod 23 and rod 28. Instead, rod 23 is bent to form a hook 31 which catches about the top of rod 28 forming a detachable retaining means. The purpose therefore hereinafter will be discussed. A pair of angle braces 32 and 33 made from corresponding material are attached to rods 23 and 29.

The end of rod 28 is bent downwardly to form a hinge pin 36. Rod 30 has an end bent upwardly to form a hinge pin 37. Pin 36 is received in an eye 38 on side 13. A similar eye 39 pivotally supports pin 37. Eyes 38 and 39 are formed by slitting side 13 at two spaced points. The material between the slits is pressed inwardly, e.g., drawn, into a generally annular shape to define the eye of the hinge. The parts of rods 28 and 30 immediately adjacent pins 36 and 37 should be spaced apart a distance that is only slightly greater than the distance that the two furthest ends of eyes 38 and 39 are spaced. This is important to hold pins 36 and 37 in their respective eyes under normal conditions.

The latch is illustrated in FIGURE 4. Side 15 has a cut-out notch 40 which defines a reentrant finger 41. The top of finger 41 has a small depression 42 into which a tongue portion of rod 29 is seated. The outer end 43 of rod 29 is turned angularly so as to provide a stop outside of the outer face of side 15. Adjacent end 43, rod 29 is bent away from the face of filter 11 to define a handle 44.

The side members 12–15 are inexpensively formed of sheet metal. Eyes 38 and 39 can be formed in a stamping or pressing operation. Notch 40 can be die cut. Flanges 16–19 are formed by bending the material used to form sides 12–15.

The parts are so positioned that when the filter is in place and being held by the retainer some pressure is applied to the face of filter 11 by the retainer. As a result of this pressure at least some of the rods forming the retainer compress the portions of the filter with which they come in contact. Thus the filter 11 exerts an outward pressure on the retainer. This acts to hold the retainer in place. When it is desired to replace filter 11, a person may grasp handle 44 and move the portion of rod 29 that is seated in depression 42 of finger 41 upwardly and inwardly around the curve of notch 40. After the inward movement, rod 29 is moved downwardly and outwardly through the open front of notch 40. This disengages the right end of the retainer from the frame and the retainer may be swung about the hinged left end.

Normally this is all that is done to remove and replace one of filters 11. However, if it is desired to completely remove the retainer from the frame, hook 31 is slipped off of rod 28. With the upper end of rod 23 disengaged from rod 28, the ends of rods 28 and 30 may be separated sufficiently to permit one of the hinge pins, e.g., pin 36, to be removed from its respective eye, e.g., eye 38. With one of the hinge pins removed, it obviously is a simple matter then to slide the other hinge pin from its eye. The foregoing process is reversed to install a retainer in the frame. One of the hinge pins is slipped into its eye. Thereafter, the ends of rods 28 and 30 are separated sufficiently to permit the other of the hinge pins to be inserted in its eye. After both hinge pins are in place hook 31 of rod 23 is engaged about the top of rod 28 to lock the two hinge pins in place. Rod 29 then is manipulated by means of handle 44 so as to insert the rod into notch 40. Rod 29 is raised until it is seated in depression 42 of finger 41. The filter then is securely held between the retainer and screen 20.

It will be understood that almost all air filtering media is resilient. Although not indispensible to the structure and operation of the retainer of the invention, a resilient filter body is advantageous in that it tends to press rod 23 outwardly into locked position with respect to rod 28 in the assembly with the filter in position. Also, assuming that the body of the filter is somewhat compressed by the retainer, the resilience of the material will hold the retainer latched in locked position and will compress sufficiently to permit disengagement of the latch. At the same time, the bent end portion 43 of rod 29 prevents accidental releasing of the latch without necessitating the undesirable extension of rod 29 to provide insurance against withdrawal of the rod from the latch notch.

Various adaptations of the invention may be made without departing from its essential features as defined in the appended claims.

I claim:

1. A filter cell including: a filter having two sides; a frame to receive the filter and having means to contact one side of the filter to restrain the filter against movement through the frame in the direction of said one side, said frame being rectangular with four sides, a pair of coaxial hinge eyes on a first side of the frame adjacent an edge and the other side of the filter and defining a pivotal axis approximately parallel to said first side of the frame; a wire grid means positioned to bear against the other side of the filter and to urge the filter in said direction, said grid means including two spaced members positioned approximately normal to the first side of the frame, a pair of hinge pins connected to said members respectively and entering said hinge eyes, respectively, from opposite directions, and retaining means releasably connecting the members adjacent the pins to normally prevent the members from moving with respect to each other in the reverse of said directions, whereby the pins normally are held in the eyes but may be removed by releasing said retaining means and moving the members with respect to each other in the reverse of said directions to provide room for the axial movement of the pins in the eyes; and latch means releasably connecting the grid means and the side of the frame opposite said first side.

2. A filter cell including: a filter having two sides; a frame to receive the filter and having means to contact one side of the filter to restrain the filter against movement through the frame in the direction of said one side, said frame being rectangular with four sides, a pair of coaxial hinge eyes on a first side of the frame adjacent an edge and the other side of the filter and defining a pivotal axis approximately parallel to said first side of the frame; a wire grid means positioned to bear against the other side of the filter and to urge the filter in said direction, said grid means including two spaced members positioned approximately normal to the first side of the frame, a pair of hinge pins connected to said members respectively and entering said hinge eyes, respectively, from the two furthest sides of the eyes, said two spaced members, adjacent said pins, being a distance apart that is only slightly greater than the distance between said two furthest sides of the eyes, a third member attached to one of the two spaced members and releasably hooked about the furthest side of the other of the two spaced members to normally prevent the separation of the two members, whereby the pins normally are held in the eyes, but may be removed by unhooking said wire from said other member and separating the two spaced members to provide room for the axial movement of the pins in the eyes; and latch means releasably conecting the grid means and the opposite side of the frame.

3. A filter cell including: a filter having two sides; a frame to receive the filter and having means to contact one side of the filter to restrain the filter against movement through the frame in the direction of said one side, said frame being rectangular with four sides, a pair of coaxial hinge eyes on a first side of the frame and defining a pivotal axis approximately parallel to said first side of the frame; a latch notch on the side of the frame opposite the first side and defining a reentrant finger; and a wire grid means positioned to bear against the other side of the filter and to urge the filter in said direction, said grid means including two spaced members positioned approximately normal to the first side of the frame, a pair of hinge pins connected to said members respectively and entering said hinge eyes, respectively, from the two furthest sides of the eyes, said two spaced members, adjacent said pins, being a distance apart that is only slightly greater than the distance between said two furthest sides of the eyes, a third member attached to one of the two spaced members and releasably hooked about the opposite side of the other of the two spaced members to normally prevent the separation of the two members, whereby the pins normally are held in the eyes, but may be removed by unhooking said wire from said other member and separating the two spaced members to provide room for the axial movement of the pins in the eyes, said grid means defining a handle, and a tongue entering said slot and normally held by said fingers, said tongue including means outside said frame at said notch to prevent movement of the tongue with respect to the finger.

4. A filter cell including: a filter having two sides; a frame to receive the filter and having means to contact one side of the filter to restrain the filter against movement through the frame in the direction of said one side, said frame being rectangular with four sides, said frame having a flange portion along a first side of the frame adjacent an edge of the filter, said flange portion having two spaced parts deformed inwardly toward the side of the frame opposite the first side to define spaced hinge eyes encircling a common axis, said frame having a second flange portion at the said opposite side of the frame, said second flange portion defining a hook-shaped notch with a reentrant finger; and a wire grid means positioned to bear against the other side of the filter and to urge the filter in said direction, said grid means including two spaced members positioned approximately normal to the first side of the frame, a pair of hinge pins connected to said members respectively and entering said hinge eyes, respectively, from the two furthest sides of the eyes, said two spaced members, adjacent said pins, being a distance apart that is only slightly greater than the distance between said two furthest sides of the eyes, a third member attached to one of the two spaced members and releasably hooked about the opposite side of the other of the two spaced members to normally prevent the separation of the two members, whereby the pins normally are held in the eyes, but may be removed by unhooking said wire from said other member and separating the two spaced members to provide room for the axial movement of the pins in the eyes; said frame means defining a handle, and a tongue entering said slot and normally held by said finger, said tongue including means outside said frame at said notch to prevent inward movement of the tongue with respect to the finger.

References Cited in the file of this patent

UNITED STATES PATENTS

| | | |
|---|---|---|
| 2,230,765 | Shimer | Feb. 4, 1941 |
| 2,597,927 | Endres | May 27, 1952 |
| 2,895,565 | Brun et al. | July 21, 1959 |
| 2,936,854 | Lucas | May 17, 1960 |
| 3,041,099 | Stewart et al. | June 26, 1962 |
| 3,047,994 | Brun | Aug. 7, 1962 |
| 3,093,401 | Hagendoorn | June 11, 1963 |
| 3,100,557 | Getzkin | Aug. 13, 1963 |

FOREIGN PATENTS

| | | |
|---|---|---|
| 262,120 | Italy | Jan. 9, 1927 |
| 479,972 | Canada | Jan. 1, 1952 |